Oct. 27, 1931.    H. A. COWARDIN    1,829,701
OIL RELAY GOVERNOR
Filed Jan. 20, 1928    6 Sheets-Sheet 1

INVENTOR
HARRY A. COWARDIN
BY Faulkner Foulke
ATTORNEYS

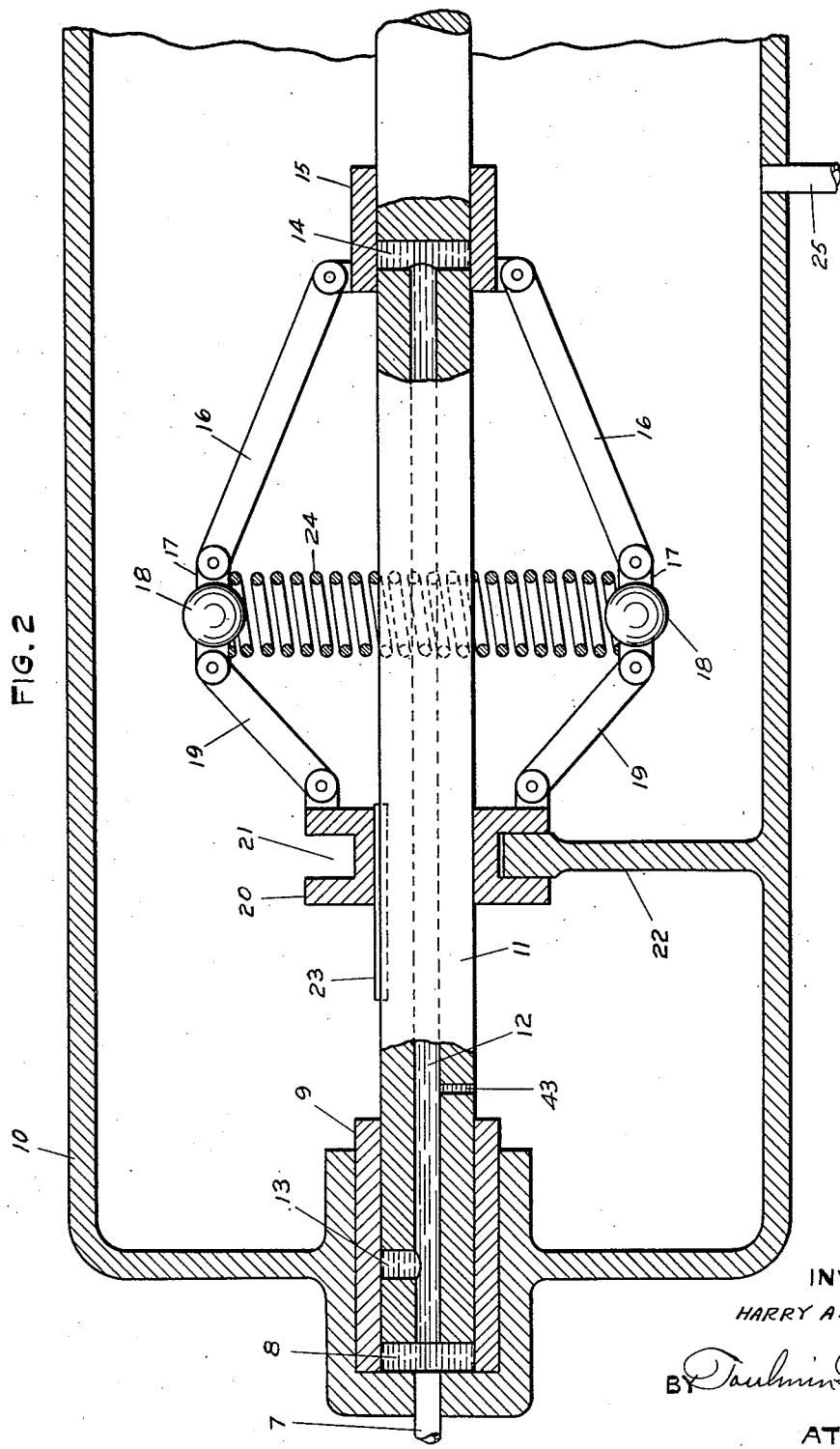

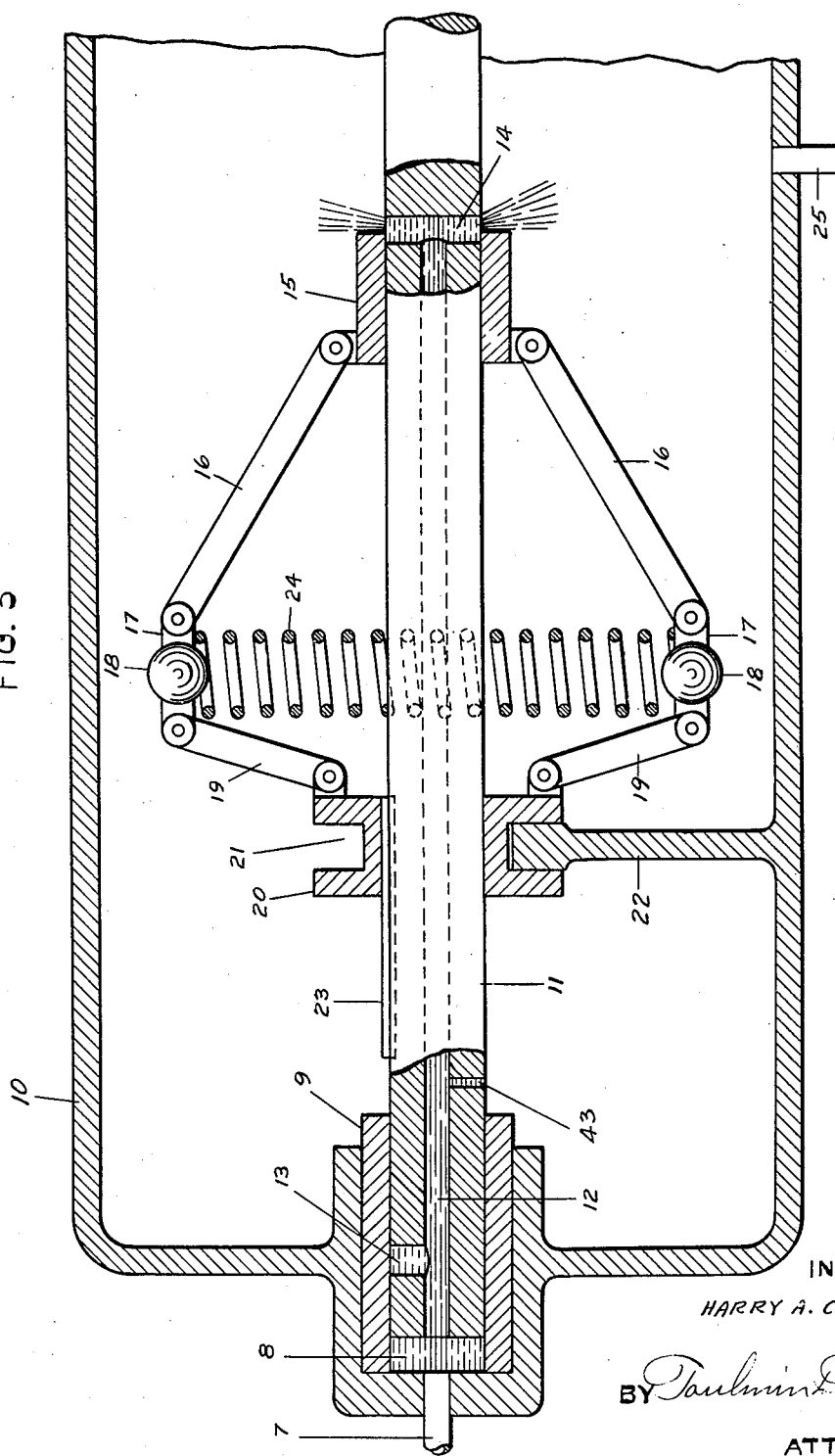

Oct. 27, 1931.  H. A. COWARDIN  1,829,701
OIL RELAY GOVERNOR
Filed Jan. 20, 1928    6 Sheets-Sheet 4
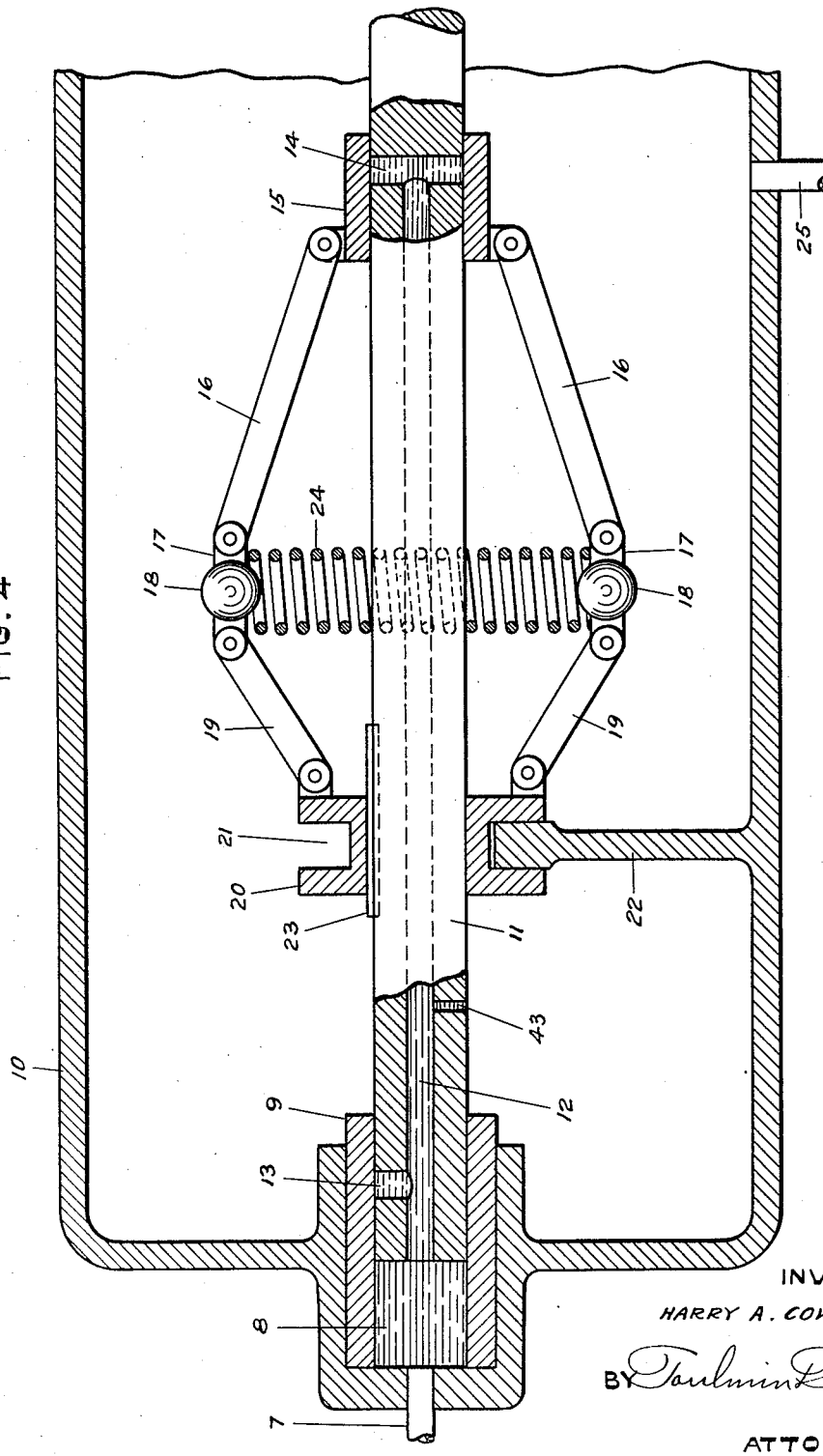
INVENTOR
HARRY A. COWARDIN
BY Toulmin Toulmin
ATTORNEYS

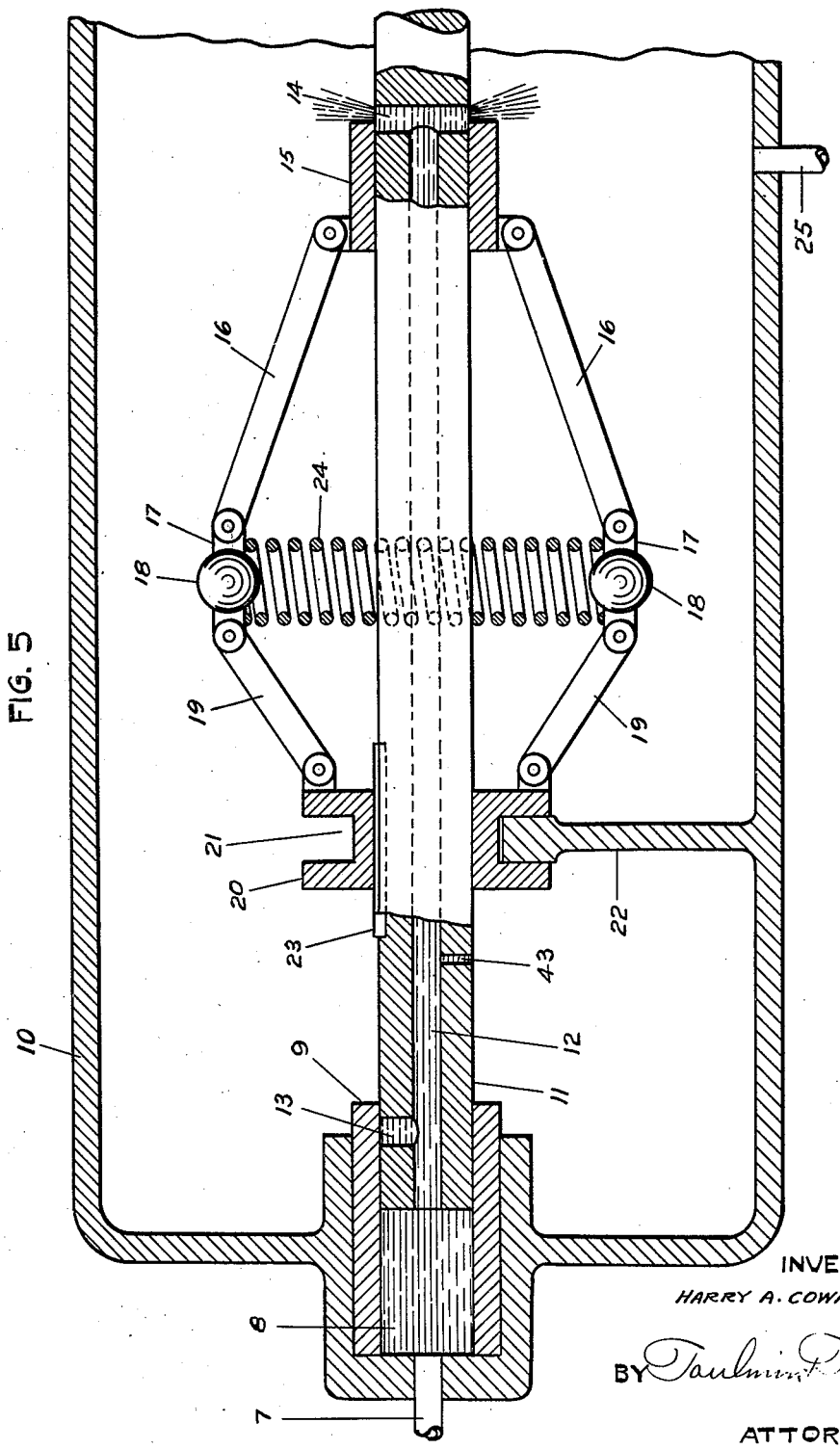

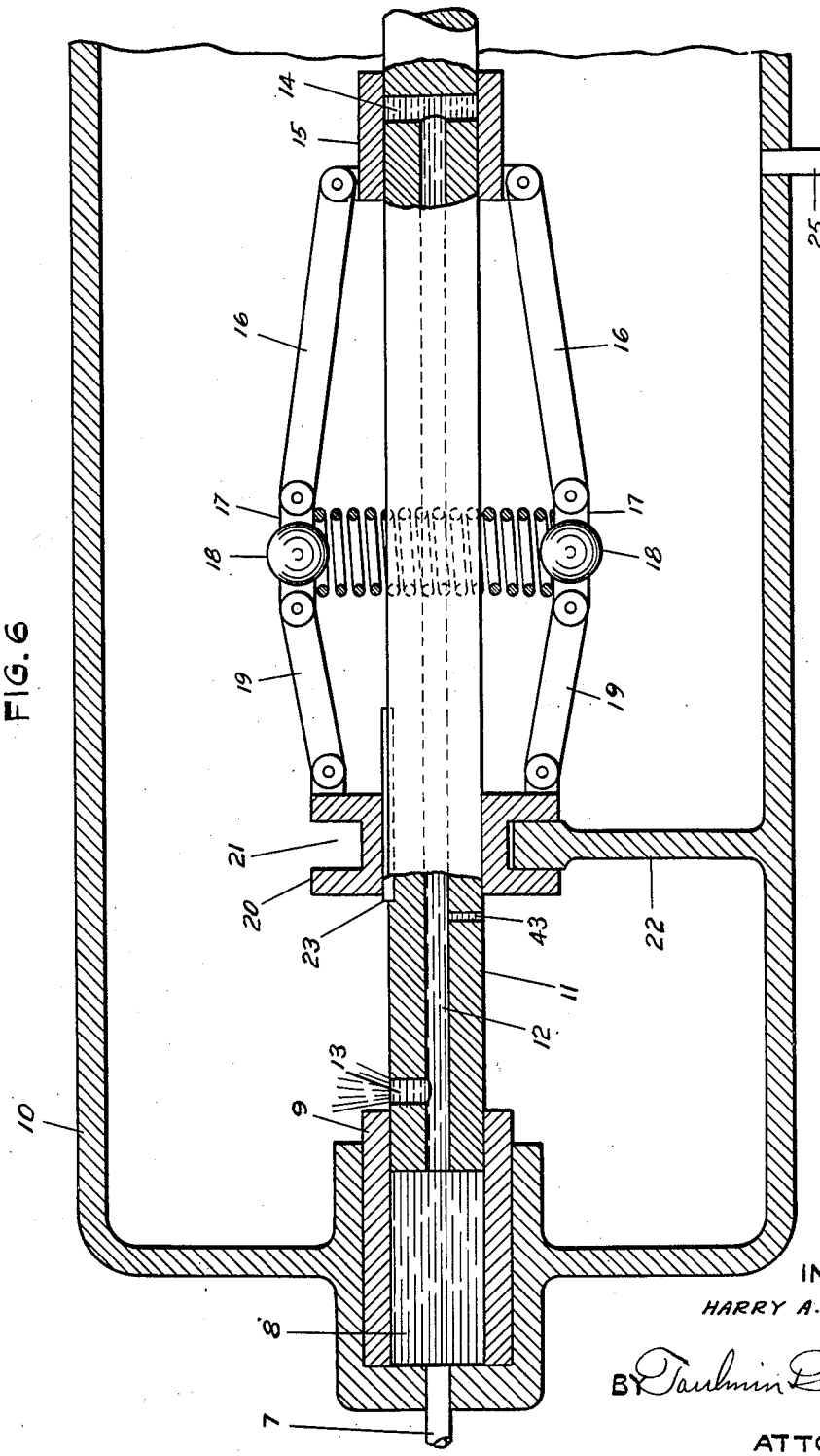

Patented Oct. 27, 1931

1,829,701

UNITED STATES PATENT OFFICE

HARRY A. COWARDIN, OF MARION, OHIO, ASSIGNOR OF ONE-HALF TO SAMUEL P. COWARDIN, OF RICHMOND, VIRGINIA

OIL RELAY GOVERNOR

Application filed January 20, 1928. Serial No. 248,260.

My invention relates to governors, particularly adaptable to internal combustion engines.

It is the object of my invention to provide a governor which will be immediately responsive to maintain an even predetermined speed by controlling the fuel supply.

It is a further object to provide such a governor which utilizes the oil pressure system of the engine as the motive power for regulating the mechanism that controls the fuel supply, while utilizing a governor for controlling the application of the oil supply for this purpose.

It is a further object to provide such a governor and oil supply actuating mechanism in combination with the oil supply of the engine to which the governor is attached so that in the event of the failure of the oil supply to the engine the governor machanism will immediately operate to stop the engine.

In detail, it is my object to provide for an injection type oil engine, a governor of small dimensions of simple construction and low cost which controls the application of power to move the cam shaft of the engine axially for the control of the period and the amount of injection to the engine.

It is a further object to provide a safety device which will prevent the cam shaft from being held in full load position when the engine is stopped due to an overload.

Referring to the drawings:

Figure 2 is an enlarged view of the governor mechanism partially in section in stop or in rest position;

Figure 3 is a similar view showing the parts in the position they assume at no load;

Figure 4 is a similar view at full load before the cam shaft moves;

Figure 5 is a similar view at full load after the cam shaft moves;

Figure 6 is a view at overload or showing the result in case the governor fails to work.

Figure 1:
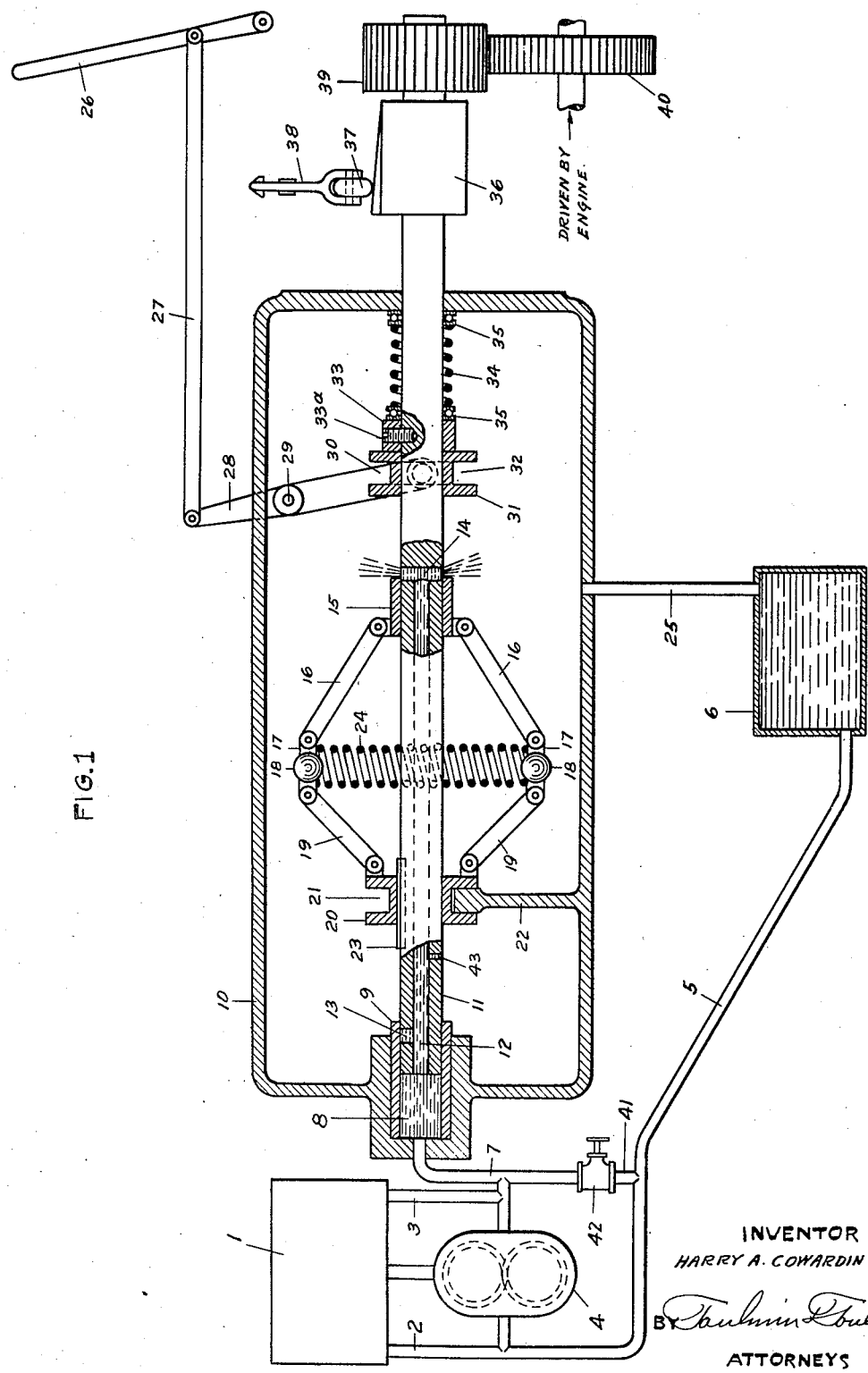
Figure 1 is a diagrammatic view of the associated parts of this mechanism of my invention showing the governor casing and portions of the governor mechanism in section.

In general, the scheme of operation of my invention is to utilize oil pressure, preferably the oil pressure of the lubrication system of the engine, to move the cam shaft of the engine axially for adjusting the position of the cams on the cam shaft with respect to the actuating mechanism which controls the period and amount of injection of an oil engine. This power means of the oil supply system is controlled in its application by a relatively small governor.

Referring to the drawings in detail, 1 indicates the engine having pipes 2 and 3 connected to a pump 4. This pump is connected by a supply line 5 to a supply tank 6 while on the other side it is connected by a pipe 7 to a cylinder 8. This cylinder is formed within a cam shaft bearing 9 carried in the housing 10 of the governor. Reciprocating in this bearing 9 is a cam shaft 11. This cam shaft is controlled centrally thereof with an oil passageway open at the left hand end into the cylinder 8. The passageway is designated 12 while adjacent the cylinder end of the passageway is a transverse relief port 13 leading from the passageway 12 to the side of the cam shaft. The right hand end of the passageway 12 terminates in a transverse passageway 14 which empties on either side of the cam shaft. This transverse passageway 14 is adapted to be closed or partially closed by the governor sleeve 15 which is connected to a plurality of governor arms 16 that are in turn connected to links 17 carrying weights 18. The other side of the links 17 are connected to the arms 19 which are attached to the collar 20 having the groove 21. This collar is engaged in its groove 21 by the stationary arm 22 which is a part of the casing 10. It is adapted to rotate with the cam shaft 11 as it is splined on the cam shaft by the spline 23. The outward movement of the weighted arms of the governor is resisted by the springs 24.

The casing 10 is provided with a return line 25 for returning the oil from the casing 10 to the oil reservoir 6.

The starting of the engine is effected through the control lever 26 which is attached to a pitman 27 which in turn is pivotally connected to a lever 28 pivotally mounted at 29 and having at its lower end a yoke 30 engaging with a collar 31 in the groove 32 thereof. A stop 33 is fixed on the cam shaft 11 by the set screw 33a.

Engaging with the stop 33 is a helical spring 34 surrounding the cam shaft. The other end of the helical spring engages with the casing 10.

Between the ends of the springs 34 and the stop and casing respectively are ball bearings 35.

Exteriorly of the casing 10 the cam shaft is provided with cams 36 which engage with cam rollers 37 that actuate the injector mechanism automatically, illustrated and generally referred to as 38. The cam shaft may be driven in any desired manner as by the gears 39 and 40.

A cut off 41 controlled by the valve 42 is used to stop the engine as the cutting off of the oil to the governor mechanism will move the injection cam mechanism to inoperative position by reason of the pressure of the spring 34 tending to move it to the left hand position when the oil pressure in chamber 8 is suitably reduced. This valve 42 is normally closed, and when opened, the oil from the pump 4 by-passes through 41 back to the pump as a line of less resistance than entering the chamber 8, allowing the shaft 11 to return to the left because of the pressure due to spring 34 on stop or collar 33.

Method of operation

With the parts in position as shown in Figure 2, the engine is started and as it is started the oil pressure begins to build up while, at the same time, the speed of the cam shaft serves to throw the weights outwardly on the governor with the result that the sleeve 15 is drawn backwardly to allow the passageway 14 to be exposed so that the oil can escape which is accumulated in the chamber 8. Thus, the no-load condition of the engine will be adjusted so that it will be maintained at a safe speed.

When the engine is adjusted to full load, the reduction in speed of the cam shaft will result in the approach of the weights of the governor to the cam shaft moving the sleeve 15 over the passageway 14 enabling the oil pressure in the chamber 8 to build up and thereby move the cam shaft to the right hand against the resistance of the spring 34 with the result that the cam 36 is moved to adjust the engine to the full load condition. The speed of the cam shaft controlling the governor sleeve 15 in conjunction with the movement of the cam shaft will expose the port 14 and allow just sufficient oil to escape to maintain the cam shaft in its proper position.

Thus, I am able to secure the movement of the cam shaft by means of the oil pressure which is completely and readily dependent upon the engine operation as the pump 4 is driven from the engine as illustrated.

If desired, the pump and oil system for the governor may be independent of the oiling system for the engine but if they are combined the additional advantage of the safety factor of stopping the engine if there is insufficiency of the oil supply to lubricate it is secured.

When the engine is running if the load is increased the centrifugal force of the governor will lessen so that the governor spring will contract the governor arms moving the governor sleeve 15 to the right.

As soon as pressure builds up the cam shaft is moved to the right, thus uncovering the passageway 14. This movement of the cam shaft to the right is against the pressure of the spring 34 which resists the movement so that equilibrium is established between the pressure in the spring and the oil in the cylinder.

If the load on the engine is decreased the sleeve is moved by increased centrifugal force of the governor due to the speed up of the engine to the left fully opening the passageway 14 and relieving the pressure in the cylinder 8. This allows the spring 34 to move the cam shaft to the left until equilibrium is again restored.

In the event that the governor does not work, the safety outlet 13 will permit the oil in the cylinder 8 to escape without the necessity of the passageway 14 being uncovered.

The passageway 14 is opened due to the action of the governor and when this passage is open oil pressure behind the cam shaft is released so that this shaft has a tendency to move toward the left due to the action of the spring 34, but in the event that the governor does not work and hence the passageway 14 is not opened, the pressure in the cylinder 8 will be built up to the point where the cam shaft is forced to the right sufficient that the passageway or outlet 13 passes beyond the sleeve 9, at which time the pressure is released by the oil passing out at the outlet 13. This pressure being released, the spring 34 will force the cam shaft to the left again. In the event that the pressure again increases and the governor does not work, the pressure will force the cam shaft to the right opening the outlet 13, through which the oil passes to relieve the pressure.

In starting the engine, when there is no pressure on the oil, the hand lever 26 moves the collar 31 which in turn moves the cam shaft into running position. When the engine speeds the oil pressure rises in the cylinder 8 and the governor then takes up its functions. A slight leakage of oil is permitted through the bleed passageway 43 from the passageway 12 in the cam shaft so that, if the engine is stalled under load, the oil pressure is immediately relieved but the size of the opening 43 is not sufficient to disturb the mechanism during normal operation.

When the oil pressure is so relieved by the bleed 43, the spring 34 returns the cam shaft to off position preventing the cam shaft from holding the injectors of the oil engine open.

When the oil tank 6 is used as the supply tank for lubricating oil for the engine, it of necessity follows that, if the oil supply to the engine falls off, the oil supply to the governor will also fail, the pressure in the cylinder 8 cannot be maintained and the spring 34 will throw the cam shaft to stop position, thus preventing the engine from being injured by lack of lubricating oil.

It will be understood that I desire to comprehend within my invention such modifications as may be necessary to adapt it to varying conditions and uses.

Having thus fully described my invention, what I claim as new and desire to secure by Letters Patent, is:

1. In combination with an engine, a cam shaft, an oil pressure system adapted to move said cam shaft axially, and governor means rotating with said cam shaft to regulate said oil pressure to control the axial movement of the cam shaft.

2. In combination with an engine, a cam shaft, an oil pressure system adapted to move said cam shaft axially, and governor means rotating with said cam shaft to regulate said oil pressure to control the axial movement of the cam shaft, and yielding means to resist axial movement of the cam shaft.

3. In combination with an engine, a cam shaft, an oil pressure system adapted to move said cam shaft axially, and governor means rotating with said cam shaft to regulate said oil pressure to control the axial movement of the cam shaft, and yielding means to resist axial movement of the cam shaft, said oil pressure system constituting a part of the lubrication system for the engine.

4. In an engine, the combination of axially movable cam shaft for controlling the fuel supply to the engine, means to rotate the cam shaft, oil pressure means for moving said cam shaft axially to vary the position of the cams with respect to the fuel supply mechanism of the engine, governor mechanism rotating with the cam shaft adapted to control the extent to which the oil pressure moves the cam shaft axially.

5. In an engine, the combination of axially movable cam shaft for controlling the fuel supply to the engine, means to rotate the cam shaft, oil pressure means for moving said cam shaft axially to vary the position of the cams with respect to the fuel supply mechanism of the engine, governor mechanism rotating with the cam shaft adapted to control the extent to which the oil pressure moves the cam shaft axially, and yielding means to yieldingly resist the axial movement of the cam shaft and to maintain it normal when at rest in no load position.

6. In an engine, the combination of axially movable cam shaft for controlling the fuel supply to the engine, means to rotate the cam shaft, oil pressure means for moving said cam shaft axially to vary the position of the cams with respect to the fuel supply mechanism of the engine, governor mechanism rotating with the cam shaft adapted to control the extent to which the oil pressure moves the cam shaft axially, and yielding means to yieldingly resist the axial movement of the cam shaft and to maintain it normal when at rest in no load position, means to manually move said cam shaft axially prior to the building up of oil pressure in the oil pressure system for starting.

7. In an engine, the combination of axially movable cam shaft for controlling the fuel supply to the engine, means to rotate the cam shaft, oil pressure means for moving said cam shaft axially to vary the position of the cams with respect to the fuel supply mechanism of the engine, governor mechanism rotating with the cam shaft adapted to control the extent to which the oil pressure moves the cam shaft axially, and yielding means to yieldingly resist the axial movement of the cam shaft and to maintain it normal when at rest in no load position, and relief means to relieve the oil pressure when the engine becomes overloaded, or in the event said governor means fail to properly relieve the oil pressure.

8. In an engine, the combination of an axially movable cam shaft for controlling the application of fuel to the engine, an engine oil pressure system, means for applying said oil pressure to axially move said cam shaft, means to resist said movement of said cam shaft, governor means mounted on said cam shaft and turning therewith to control the extent to which the oil pressure is applied to said cam shaft, and a common reservoir for said engine oil and the oil used in said means for moving said cam shaft axially, and means to relieve said oil pressure from said cam shaft moving means to stop the engine.

9. In an engine, the combination of an axially movable cam shaft for controlling the application of fuel to the engine, an engine oil pressure system, means for applying said oil pressure to axially move said cam shaft, means to resist the movement of said cam shaft, governor means mounted on said cam shaft and turning therewith to control the extent to which the oil pressure is applied to said cam shaft, and a common reservoir for said engine oil and the oil used in said means for moving said cam shaft axially, and means to relieve said oil pressure from said cam shaft moving means to stop the engine, and means to move said cam shaft axially manually to start the engine prior to the building up of the oil pressure.

10. In combination, an axially shiftable cam shaft, fuel control mechanism actuated and controlled thereby, means for rotating said shaft, a governor mounted on said shaft rotating therewith, a power cylinder adapted to move said shaft axially, yielding means to resist said movement, said power cylinder having a relief port controlled by said governor.

11. In combination, an axially shiftable cam shaft, fuel control mechanism actuated and controlled thereby, means for rotating said shaft, a governor mounted on said shaft rotating therewith, a power cylinder adapted to move said shaft axially, yielding means to resist said movement, said power cylinder having a relief port controlled by said governor, said port being formed in said cam shaft.

12. In combination, a reciprocable cam shaft for controlling the application of fuel to an engine, means for rotating the cam shaft, centrifugally operated governor means turning with said cam shaft, means to prevent the bodily movement of said governor axially with the cam shaft, valve means controlled by said governor slidably mounted on said shaft, said shaft having a passageway therethrough controlled by said valve, means to yieldingly resist the axial movement of said shaft, a power cylinder adapted to support said shaft slidably, communicating with the passageway through the shaft, and means for supplying fluid pressure to said power cylinder.

13. In combination, a reciprocable cam shaft for controlling the application of fuel to an engine, means for rotating the cam shaft, centrifugally operated governor means turning with said came shaft, means to prevent the bodily movement of said governor axially with the came shaft, valve means controlled by said governor slidably mounted on said shaft, said shaft having a passageway therethrough controlled by said valve, means to yieldingly resist the axial movement of said shaft, a power cylinder adapted to support said shaft slidably, communicating with the passageway through the shaft, and means for supplying fluid pressure to said power cylinder, and means to relieve the fluid pressure and convey the fluid from said cylinder away from said cam shaft for recirculation.

14. In combination, a reciprocable cam shaft for controlling the application of fuel to an engine, means for rotating the cam shaft, centrifugally operated governor means turning with said cam shaft, means to prevent the bodily movement of said governor axially with the cam shaft, valve means controlled by said governor slidably mounted on said shaft, said shaft having a passageway therethrough controlled by said valve, means to yieldingly resist the axial movement of said shaft, a power cylinder adapted to support said shaft slidably, communicating with the passageway through the shaft, and means for supplying fluid pressure to said power cylinder, and means to relieve the fluid pressure and convey the fluid from said cylinder away from said cam shaft for recirculation, and a safety relief port in the cam shaft normally closed by the wall of said cylinder and adapted to be exposed when the cam shaft is moved axially when the engine has exceeded its safety load.

15. In combination, a reciprocable cam shaft for controlling the application of fuel to an engine, means for rotating the cam shaft, centrifugally operated governor means turning with said cam shaft, means to prevent the bodily movement of said governor axially with the cam shaft, valve means controlled by said governor slidably mounted on said shaft, said shaft having a passageway therethrough controlled by said valve, means to yieldingly resist the axial movement of said shaft, a power cylinder adapted to support said shaft slidably, communicating with the passageway through the shaft, and means for supplying fluid pressure to said power cylinder, and means to relieve the fluid pressure and convey the fluid from said cylinder away from said cam shaft for recirculation, and a safety relief port in the cam shaft normally closed by the wall of said cylinder and adapted to be exposed when the cam shaft is moved axially when the engine has exceeded its safety load, and means to bleed said passageway through the cam shaft.

16. In combination, a reciprocable cam shaft for controlling the application of fuel to an engine, means for rotating the cam shaft, centrifugally operated governor means turning with said cam shaft, means to prevent the bodily movement of said governor axially with the cam shaft, valve means controlled by said governor slidably mounted on said shaft, said shaft having a passageway therethrough controlled by said valve, means to yieldingly resist the axial movement of said shaft, a power cylinder adapted to support said shaft slidably, communicating with the passageway through the shaft, and means for supplying fluid pressure to said power cylinder, and means to relieve the fluid pressure and convey the fluid from said cylinder away from said cam shaft for recirculation, and a safety relief port in the cam shaft normally closed by the wall of said cylinder and adapted to be exposed when the cam shaft is moved axially when the engine has exceeded its safety load, and means to bleed said passageway through the cam shaft, and means to move said cam shaft manually for starting purposes, and means to cut off the fluid pressure to stop the engine.

17. In combination, an engine operated cam shaft adapted to control the supply of fuel to the engine, said cam shaft being adapted to rotate and have axial movement, yielding means to resist the movement of said cam shaft in one direction, a fluid pressure cylinder adapted to support one end of the cam shaft, means of supplying fluid under pressure thereto and for delivering fluid through a passageway through a portion of the length of the cam shaft and a lateral port, a governor mounted on said cam shaft and rotating therewith operated by centrifugal force, said cam shaft being adapted to have axial movement through said governor, a valve sleeve mounted on said shaft adapted to close the port in said shaft through which the pressure fluid makes its exit from the cylinder, said valve sleeve being controlled by the governor.

18. In combination, an engine operated cam shaft adapted to control the supply of fuel to the engine, said cam shaft being adapted to rotate and have axial movement, yielding means to resist the movement of said cam shaft in one direction, a fluid pressure cylinder adapted to support one end of the cam shaft, means of supplying fluid under pressure thereto and for delivering fluid through a passageway through a portion of the length of the cam shaft and a lateral port, a governor mounted on said cam shaft and rotating therewith operated by centrifugal force, said cam shaft being adapted to have axial movement through said governor, a valve sleeve mounted on said shaft adapted to close the port in said shaft through which the pressure fluid makes its exit from the cylinder, said valve sleeve being controlled by the governor, a casing for a portion of said shaft and said governor to collect the fluid discharge through the cam shaft, means to return the fluid to a reservoir and thence to the pressure means for creating the fluid pressure.

19. In combination, an engine operated cam shaft adapted to control the supply of fuel to the engine, said cam shaft being adapted to rotate and have axial movement, yielding means to resist the movement of said cam shaft in one direction, a fluid pressure cylinder adapted to support one end of the cam shaft, means of supplying fluid under pressure thereto and for delivering fluid through a passageway through a portion of the length of the cam shaft and a lateral port, a governor mounted on said cam shaft and rotating therewith operated by centrifugal force, said cam shaft being adapted to have axial movement through said governor, a valve sleeve mounted on said shaft adapted to close the port in said shaft through which the pressure fluid makes its exit from the cylinder, said valve sleeve being controlled by the governor, a casing for a portion of said shaft and said governor to collect the fluid discharge through the cam shaft, means to return the fluid to a reservoir and thence to the pressure means for creating the fluid pressure, a by-pass in said fluid pressure line, and means for opening said by-pass to shut off the fluid pressure to stop the engine.

20. In combination, an engine operated cam shaft adapted to control the supply of fuel to the engine, said cam shaft being adapted to rotate and have axial movement, yielding means to resist the movement of said cam shaft in one direction, a fluid pressure cylinder adapted to support one end of the cam shaft, means of supplying fluid under pressure thereto and for delivering fluid through a passageway through a portion of the length of the cam shaft and a lateral port, a governor mounted on said cam shaft and rotating therewith operated by centrifugal force, said cam shaft being adapted to have axial movement through said governor, a valve sleeve mounted on said shaft adapted to close the port in said shaft through which the pressure fluid makes its exit from the cylinder, said valve sleeve being controlled by the governor, a casing for a portion of said shaft and said governor to collect the fluid discharge through the cam shaft, means to return the fluid to a reservoir and thence to the pressure means for creating the fluid pressure, and means to move said cam shaft axially manually to set the cam shaft to starting position.

21. In combination, an engine, a cam shaft for controlling the application of fuel to the engine, said cam shaft being adapted to have axial movement and to rotate and be driven by and with said engine, a fluid pressure cylinder adapted to support said cam shaft as a piston, a pressure pump adapted to supply lubricant to the engine and to said fluid pressure cylinder from a common oil supply, a passageway through said cam shaft having a discharge port outside of said cylinder, a valve controlling said port in the cam shaft slidably mounted thereon and centrifugally operated means turning with the cam shaft adapted to move said valve and stationary means for preventing the axial movement other than as to the valve means of said centrifugally operated means and yielding means resisting the movement of the cam shaft axially by reason of the pressure in the fluid pressure cylinder.

22. In a method of controlling the speed of an engine, creating fluid pressure by the operation of the engine, utilizing this fluid pressure for controlling the supply of fuel to the engine, and regulating this control by the fluid pressure according to the speed of rotation of the means controlling the supply of fuel to the engine, and supplying lubricant to the engine from the same source of fluid pressure for controlling the speed of the engine.

In testimony whereof, I affix my signature.

HARRY A. COWARDIN.